United States Patent
Sasaki et al.

(10) Patent No.: US 10,369,654 B2
(45) Date of Patent: Aug. 6, 2019

(54) WELDED ARTICLE AND METHOD FOR MANUFACTURING WELDED ARTICLE

(71) Applicant: ORIGIN COMPANY, LIMITED, Saitama (JP)

(72) Inventors: Hiroji Sasaki, Saitama (JP); Toshihiko Hayashi, Saitama (JP)

(73) Assignee: ORIGIN COMPANY, LIMITED, Saitama (JP)

( * ) Notice: Subject to any disclaimer, the term of this patent is extended or adjusted under 35 U.S.C. 154(b) by 0 days.

(21) Appl. No.: 15/549,625

(22) PCT Filed: Jan. 19, 2016

(86) PCT No.: PCT/JP2016/051478
§ 371 (c)(1),
(2) Date: Aug. 8, 2017

(87) PCT Pub. No.: WO2016/129337
PCT Pub. Date: Aug. 18, 2016

(65) Prior Publication Data
US 2018/0043460 A1  Feb. 15, 2018

(30) Foreign Application Priority Data
Feb. 9, 2015 (JP) ................. 2015-023431

(51) Int. Cl.
*B23K 11/14* (2006.01)
*B23K 11/00* (2006.01)
*F16B 5/08* (2006.01)

(52) U.S. Cl.
CPC .............. *B23K 11/14* (2013.01); *B23K 11/00* (2013.01); *F16B 5/08* (2013.01)

(58) Field of Classification Search
CPC .................................. B23K 11/14; F16B 5/08
See application file for complete search history.

(56) References Cited

U.S. PATENT DOCUMENTS

| 1,123,308 A | * | 1/1915 | Kicklighter | ............ | B23K 11/14 |
| | | | | | 219/92 |
| 1,123,309 A | * | 1/1915 | Kicklighter | ............ | B23K 11/14 |
| | | | | | 219/92 |

(Continued)

FOREIGN PATENT DOCUMENTS

| EP | 2514548 A1 | 10/2012 | | |
| FR | 901000 A | * 7/1945 | ............ | B23K 11/14 |

(Continued)

OTHER PUBLICATIONS

International Search Report for PCT Application No. PCT/JP2016/051478, dated Apr. 5, 2016, translation, 2 pp.

(Continued)

*Primary Examiner* — Matthieu F Setliff
(74) *Attorney, Agent, or Firm* — Squire Patton Boggs (US) LLP

(57) ABSTRACT

To enable a first welding target member including a projection on a welding target portion having short sides and long sides and a second welding target member to be bonded by resistance welding with high welding strength. A manufacturing method for manufacturing a welded article by bonding a first welding target member including an elongated projection portion on a welding target portion having short sides and long sides that are longer than the short sides and a second welding target member by resistance welding, in which the projection portion of the first welding target member is subdivided by forming subdividing grooves extending in the direction of the short sides in the projection portion to reduce the influence of skin effect on the welding current flowing through the subdivided projection portions and improve the uniformity of the current values in the direction of the long sides.

6 Claims, 7 Drawing Sheets

(56) References Cited

U.S. PATENT DOCUMENTS

| | | | | | |
|---|---|---|---|---|---|
| 1,206,885 | A | * | 12/1916 | Murray | B23K 11/002 219/105 |
| 1,229,700 | A | * | 6/1917 | Auel | B23K 11/14 219/73 |
| 1,252,142 | A | * | 1/1918 | Murray | B23K 11/002 219/107 |
| 1,253,189 | A | * | 1/1918 | Von Henke | B23K 11/14 219/92 |
| 1,411,340 | A | | 4/1922 | Gail | |
| 1,739,063 | A | | 3/1929 | Crawford et al. | |
| 1,736,539 | A | * | 11/1929 | Lachman | B23K 11/14 219/106 |
| 1,973,986 | A | * | 9/1934 | Kuhlman | B23K 11/14 219/93 |
| 2,108,795 | A | * | 2/1938 | Budd | E04C 2/36 165/170 |
| 2,814,717 | A | * | 11/1957 | Hardesty | B23K 11/0093 219/107 |
| 2,814,718 | A | * | 11/1957 | Hardesty | B23K 11/0093 219/107 |
| 3,233,073 | A | * | 2/1966 | Ruetschi | B23K 11/14 219/93 |
| 3,346,350 | A | * | 10/1967 | Spooner | B23K 11/14 219/118 |
| 3,435,871 | A | * | 4/1969 | Johnson | B23K 11/14 219/107 |
| 3,597,574 | A | * | 8/1971 | Erlandson | B23K 11/0876 219/75 |
| 3,629,544 | A | * | 12/1971 | Becker | B23K 11/163 219/78.14 |
| 3,686,462 | A | * | 8/1972 | Erlandson | B23K 11/163 219/93 |
| 3,805,014 | A | * | 4/1974 | Becker | B23K 11/14 219/92 |
| 3,925,637 | A | * | 12/1975 | Becker | B23K 11/14 219/102 |
| 4,168,795 | A | * | 9/1979 | Bennett | B23K 28/02 219/137 R |
| 4,203,020 | A | * | 5/1980 | Armbruster | B23K 11/14 219/118 |
| 4,342,893 | A | * | 8/1982 | Wolf | H01H 11/045 200/268 |
| 4,461,943 | A | * | 7/1984 | Beauvais | F25D 23/063 219/86.9 |
| 4,495,397 | A | * | 1/1985 | Opprecht | B23K 11/14 219/86.1 |
| 4,850,214 | A | * | 7/1989 | Opprecht | B23K 11/14 72/379.2 |
| 4,991,765 | A | * | 2/1991 | Sugiyama | B23K 11/14 219/107 |
| 5,304,769 | A | * | 4/1994 | Ikegami | B23K 35/0205 219/119 |
| 5,739,498 | A | * | 4/1998 | Sunamoto | B23K 11/0046 219/78.15 |
| 6,188,039 | B1 | * | 2/2001 | Gass | B21D 35/00 219/104 |
| 6,373,021 | B1 | * | 4/2002 | Wang | B23K 11/14 219/117.1 |
| 6,543,828 | B1 | * | 4/2003 | Gass | B21D 35/00 296/35.1 |
| 6,844,522 | B1 | * | 1/2005 | Wang | B23K 33/00 219/121.64 |
| 7,193,177 | B2 | * | 3/2007 | Wang | B23K 9/0026 219/137 R |
| 7,268,319 | B2 | * | 9/2007 | Wang | B23K 9/232 219/137 R |
| 7,880,112 | B2 | * | 2/2011 | Hengel | B23K 11/004 219/91.2 |
| 8,999,515 | B2 | * | 4/2015 | Horibata | B23K 11/14 428/594 |

FOREIGN PATENT DOCUMENTS

| | | | | |
|---|---|---|---|---|
| FR | 2475441 | A1 | * 8/1981 | B21D 53/40 |
| JP | H01151985 | U | * 10/1989 | |
| JP | HO1-151985 | U | 10/1989 | |
| JP | H09-174249 | A | 7/1997 | |
| JP | 3270758 | | 1/2002 | |
| JP | 2006/068807 | A | 3/2006 | |
| JP | 2007-326125 | A | 12/2007 | |
| JP | 4385373 | | 10/2009 | |
| JP | 4825056 | B2 | * 11/2011 | |

OTHER PUBLICATIONS

EPO Communication of the extended European Search Report dated Jan. 4, 2019 for European Patent Application No. 16748982.2, 6 pages.

* cited by examiner

WELDED ARTICLE AND METHOD FOR MANUFACTURING WELDED ARTICLE

TECHNICAL FIELD

This invention relates to a manufacturing method for manufacturing a welded article by bonding one welding target member having a projection formed on a welding target portion having short sides and long sides that are longer than the short sides and the other welding target member by resistance welding, and a welded article.

BACKGROUND ART

In the process of manufacturing a gear portion for an automobile, for example, a leg portion of a carrier cover and a disk-shaped member in the gear portion are often mechanically bonded to each other by electrical press-fit bonding called arc welding or ring mash (trademark) welding. In the case of arc welding, the leg portion of the carrier cover is fitted into a welding hole formed in the disk-shaped member and the entire circumference or a part of the fitted part is welded by arc welding. However, in the case of arc welding, because the period of time for which thermal energy is injected into the welding target part is much longer than that in a capacitor stored-energy welding method in which welding is carried out by discharging energy stored in a capacitor within a short period of time, thermal strain occurs in a shaft member of the carrier cover and the disk-shaped member as welding target objects, resulting in a lower dimensional accuracy. Another drawback is that the welded part between the metal materials and its vicinity undergo significant thermal deterioration or color change.

To solve such problems, an electrical press-fit bonding method has been proposed including positioning several divided leg portions of a carrier cover at bonding holes formed in a disk-shaped member, applying a bonding current to the leg portions under a pressing force to cause end parts of the leg portions of the carrier cover to undergo plastic flow and enter the bonding holes to solid-phase bond them to the disk-shaped member (see Patent Document 1, for example). However, in the bonding method and structure disclosed in Patent Document 1, the bonding holes are formed at the center of the disk-shaped member and the divided leg portions of the carrier cover are press-fit into the welding holes at a plurality of positions. Thus, when the welding target objects are employed in a mechanism in which large torque is applied between the disk-shaped member and the leg portions of the carrier cover, a large rotative force, in other words, torque is applied in such a direction as to shear the solid-phase bonded parts between the disk-shaped member and the leg portions of the carrier cover, in other words, in a direction parallel to the bonded surfaces between the disk-shaped member and the leg portions of the carrier cover.

In the case of the above-mentioned solid-phase bonding, the surfaces of the welding target objects are simply bonded in a plastic flow state. Thus, the bonding area is small and its mechanical strength is not high because the bonding depth of the bonded portion is shallow compared to the case of resistance welding where the surfaces are melted to form a nugget. In a bonded article obtained by such a bonding method, the mechanical strength in such a direction as to shear the bonded portion between the disk-shaped member and the several divided leg portions of the carrier cover cannot be high. Thus, the torque that can be applied to the bonded article is significantly limited. To remove such a drawback, a bonding method is disclosed in which leg portions of a carrier cover are press-fit bonded to the short sides of rectangular bonding holes of a plate-like bonding target member and not to the long sides thereof (see Patent Document 2, for example). In this bonding method, because the bonding current can be concentrated at the short side parts of the both members, the bonding depth of the bonded portion at the short side parts can be large to increase the bonding strength. The problem, however, is that higher strength cannot be obtained when the short side parts are short, in other words, the plate thickness at the short side parts is small.

RELATED ART DOCUMENT

Patent Document

Patent Document 1 Japanese Patent No. 3270758
Patent Document 2 Japanese Patent No. 4385373

DISCLOSURE OF INVENTION

Problem to be Solved by the Invention

An object of the present invention is how to improve the welding strength of a welded portion between a first welding target member having projection formed on a welding target portion having short sides and long sides that are longer than the short sides and a second welding target member bonded to each other by resistance welding.

Means for Solving the Problem

With reference to FIG. 6, an aspect of a method for manufacturing a welded article according to the present invention is described. This aspect provides a manufacturing method for manufacturing a welded article by bonding a first welding target member including an elongated projection portion on a welding target portion having short sides and long sides that are longer than the short sides and a second welding target member by resistance welding, in which subdividing grooves are provided in the direction of the short sides in the projection portion of the first welding target member to subdivide the projection portion, thereby improving the uniformity of the current values of the welding currents flowing through the subdivided projection portions in the directions of the long sides. In this manufacturing method, a first welding target member having an elongated projection portion having subdividing grooves is first provided (step S1). Here, the elongated portion is elongated in the direction of the long sides. Next, a second welding target member to be bonded to the first welding target member is provided (step S2). The projection portion of the first welding target member is brought into contact with the second welding target member (step 3). A pressing force is applied and a welding current is applied to the first and second welding target members to bond the first and second welding target members by resistance welding (step 4).

According to such a method for manufacturing a welded article, because the influence of skin effect can be reduced, the non-uniformity of the current distribution in the direction of the long sides of the welding current flowing through the projection can be reduced and the welding strength of the welded portion between the first and second welding target members can be increased. In the above method for manufacturing a welded article, stopper portions may be provided in the subdividing grooves or at both ends of the first welding target member so that the stopper portions can contact the second welding target member at completion of welding to stop progress of welding and allow a portion of the welding current to escape through the stopper portions. Welded articles having uniform welding strength can be obtained. In addition, in the method for manufacturing a welded article, the subdividing grooves, which are multi-dividing the projection portion, i.e., dividing into a plurality of pieces, may be provided with changing the inclination angle of the subdividing grooves. The depth or width and the number of the subdividing grooves can be easily adjusted.

In the method for manufacturing a welded article according to an embodiment of the present invention, the first welding target member may be a carrier cover with a plurality of leg portions in a gear portion; the second welding target member may be a base plate in the gear portion, each of the plurality of leg portions may have the projection portion subdivided by the subdividing grooves on an end face of the leg portion; and the subdivided projection portion may be bonded to a welding target portion of the base plate by resistance welding. When a welded article is manufactured by such a method, a gear portion having high welding strength can be obtained. In the method for manufacturing a welded article according to an embodiment of the present invention, the first welding target member may be a metal plate having a flat or curved face, the metal plate having a thickness defined by the short sides, the flat or curved face of the metal plate having a length defined by the long sides, the metal plate having the plurality of subdivided projection portions formed by the subdividing grooves on a face of the metal plate, the face of the metal plate defining its thickness, and the projection portions being a welding target portion; and the subdivided projection portions of the metal plate may be bonded to a welding target portion of the second welding target member by resistance welding. Such a method for manufacturing the welded article enables a metal plate with a relatively small thickness to be successfully bonded by stud resistance welding.

A welded article according to an embodiment of the present invention may be obtained by bonding a carrier cover having a plurality of leg portions and a base plate in a gear portion by resistance welding, wherein each of the leg portions of the carrier cover includes a plurality of subdivided projection portions on a face to be welded to the base plate, and the plurality of subdivided projection portions are in contact with and bonded to a welding target portion of the base plate by resistance welding. According to such a welded article, because the influence of skin effect can be reduced, the non-uniformity of the current distribution of the welding currents flowing through the projection portions can be reduced. This enables each leg portion of the carrier cover to be bonded to the welding target portion of the base plate by resistance welding with desired welding strength.

Effect of the Invention

According to the present invention, welding target portions of a first welding target member including a projection portion on a welding target portion having short sides and long sides that are longer than the short sides and a second welding target member can be bonded by resistance welding with high welding strength.

BEST MODE FOR CARRYING OUT THE INVENTION

This application is based on the Patent Application No. 2015-023431 filed on Feb. 9, 2015 in Japan, the contents of which are hereby incorporated in its entirety by reference into the present application, as part thereof.

The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiments. Among the disclosed changes and modifications, those which may not literally fall within the scope of the patent claims constitute, therefore, a part of the present invention in the sense of doctrine of equivalents.

Before embodiments of the present invention are described, the reason why it is conventionally difficult to bond a first welding target member having a projection on a welding target portion having short sides and long sides that are longer than the short sides and a second welding target member by resistance welding is described and the background of how the present invention has been made is described. Conventionally, when a welding target portion of a metal plate as a first welding target member having short sides extending in the direction of the thickness of the metal plate and long sides defining an elongated welding target face together with the short sides is bonded to a flat face of the other welding target member by stud resistance welding, a projection is formed on the elongated welding target portion of the first welding target member. The projection naturally has an elongated shape, and, in particular, the projection has an elongated distal end face with a small width.

Figure 7:
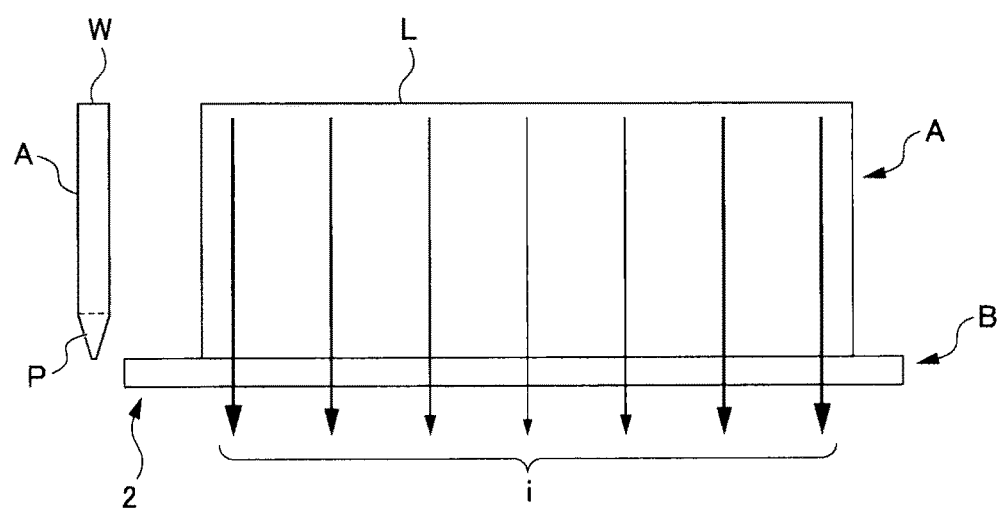
FIG. 7 is a drawing for explaining a conventional welded article.

It was found that when a welding target member A including an ordinary projection portion P on a welding target portion having an elongated welding target face defined by short sides W equal in length to the thickness thereof and long sides L along the main face as shown in FIG. 7 is bonded to the other welding target member B by stud resistance welding achieved by pressing the welding target member A against a flat face of the welding target member B and applying a welding current thereto, the projection portion P of the welding target member A is melted in the vicinity of both end portions (both end in the direction of the long sides) but is not easily melted at a central portion, and this tendency is stronger as the projection portion P is thinner and longer. Various experiments were conducted by changing the length of the long sides L of the one welding target member A to change the length of the projection portion P or adjusting the magnitude of the welding current, and it was, consequently, found that the tendency for the projection portion P of the welding target member A to be melted more easily in the vicinity of both end portions and less easily at the central portion is stronger and satisfactory stud resistance welding is therefore more difficult to achieve as the projection portion P is longer.

In other words, the welding target part corresponding to a central portion of the projection portion P of the welding target member A does not generate sufficient heat to melt itself sufficiently and functions as a stopper, resulting in insufficient welding strength. In addition, when a sufficiently high current to melt the welding target part corresponding to a central portion of the projection portion P of the welding target member A is applied, the welding target parts corresponding to the vicinity of both end portions of the projection portion P of the welding target member A may be excessively melted to the extent that it is spattered, resulting in poor welding quality.

Then, the welding currents that flow from the other end of the welding target member A through various parts of the elongated projection portion P were measured. As a result, it was found that the value of the welding current flowing through the center of the welding target member A is the lowest and the value of the welding current is getting higher as the measuring part is closer to the both ends. In other words, it was confirmed that when welding target member A, such as a metal plate, is bonded to the other welding target member B by stud resistance welding utilizing an elongated projection portion P formed on a welding target portion defining the thickness of the welding target member A, the current value of the welding current flowing through the center of the welding target member A is the lowest and the current value of the welding current is getting higher as the measuring part is closer to the both ends, by the influence of skin effect as indicated by the thicknesses of arrows i in FIG. 7. It is also confirmed that the influence of skin effect further increases and the ratio of the difference between the current value of the welding current flowing through the center of the one welding target member A and the current value of the welding currents flowing through the both end portions thereof further increases as the pulse width of the welding current is shorter or the frequency of the welding current is higher. This may be the reason why it is considered impossible to bond a face defining the thickness of a metal plate having long sides with a certain length or longer to another metal plate by stud resistance welding. It should be noted that, in the case of a ring projection, because the projection is endless, it is not affected by the influence of skin effect in its length direction and welding currents with almost equal current values flow the entire ring projection without the influence of skin effect.

In the present invention, in view of the above phenomenon, subdividing grooves are provided at least in the direction of the short sides of an elongated projection portion to subdivide the projection portion into a plurality of projection portions with a shorter length. By subdividing an elongated projection portion as described above, the influence of skin effect can be reliably reduced, and the ratio of the difference between the welding currents flowing through a central portion and both end portions of the subdivided projection portion can be smaller. In other words, the uniformity of the current distribution in the direction of the length of the subdivided projection portion can be improved.

In embodiments the present invention, a projection portion of a welding target member refers to a distal end part of the welding target member consisting of a projection and a part that is located adjacent to the projection and forms even a small nugget between it and the other welding target member to contribute to welding. The expression "subdivision of the projection portion" refers to the fact that only the projection portion is divided into short and small projection portions by subdividing grooves formed in the direction of the short width of the projection portion or that subdividing grooves are formed deeply into a part that does not contribute to welding together with the projection portion.

First Embodiment

Figure 1A:
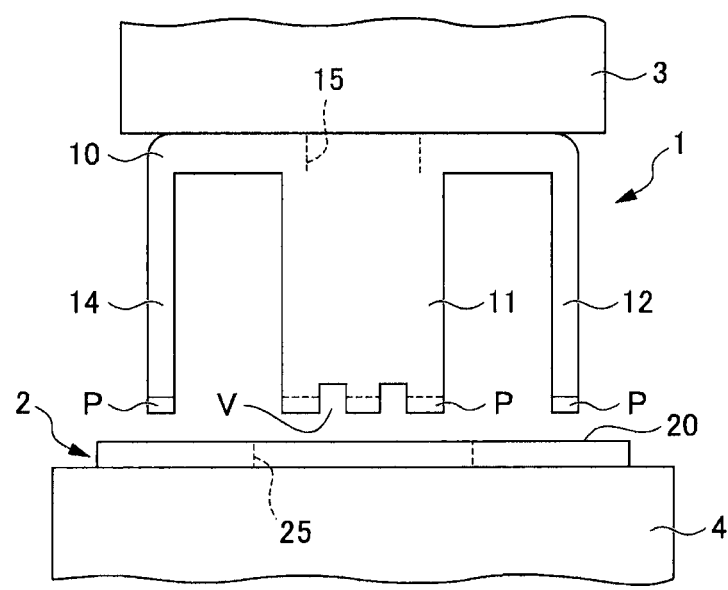
FIG. 1A is a drawing for explaining welding target members that constitute a welded article according to a first embodiment of the present invention, showing first and second welding target members.

First, a first embodiment of the present invention is described with reference to FIG. 1A to FIG. 3. A first welding target member 1 is a carrier cover of a gear portion for an automobile as described above, i.e., a metal member having a circular main body portion 10 and four separate leg portions 11, 12, 13 and 14 bent at a substantially right angle from the main body portion 10. The four leg portions 11 to 14 are provided at substantially equal intervals and have generally the same size and shape. In FIG. 1A, the leg portion 13 is behind the leg portion 11 and invisible. A second welding target member 2 to which the four leg portions 11 to 14 are bonded by projection welding is a disk-shaped metal plate. The main body portion 10 has a central hole 15 indicated by broken lines. In embodiments of the present invention, the central hole 15 is also utilized as a positioning hole as shown in FIG. 3. In FIG. 1A, a first welding electrode 3 and a second welding electrode 4 show ordinary welding electrodes that apply a pressing force to the first welding target member 1 and the second welding target member 2 and apply a welding current to the welding target members 1 and 2.

Figure 1B:
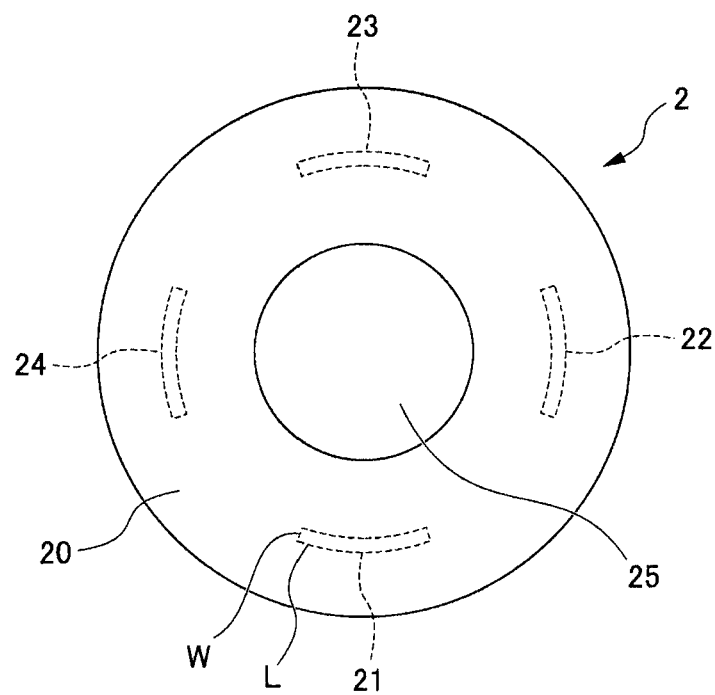
FIG. 1B is a drawing for explaining welding target members that constitute a welded article according to a first embodiment of the present invention, showing the second welding target member.

In FIG. 1B, four rectangular area 21, 22, 23 and 24 indicated by broken lines on a welding target face 20 of the second welding target member 2 as a base metal plate to which the leg portions 11 to 14 of the carrier cover are welded exemplify the spots where the four leg portions 11 to 14 are bonded by projection welding. The symbols W and L at the rectangular area 21 represent a short side and a long side, respectively, of the leg portion 11. The same applies to the rectangular areas 22, 23 and 24. A central hole 25 formed at the center of the second welding target member 2, while it has no direct relationship with the welding of the present invention and is provided for a different purpose, is also utilized as a positioning hole in the first embodiment as shown in FIG. 3.

Figure 2:
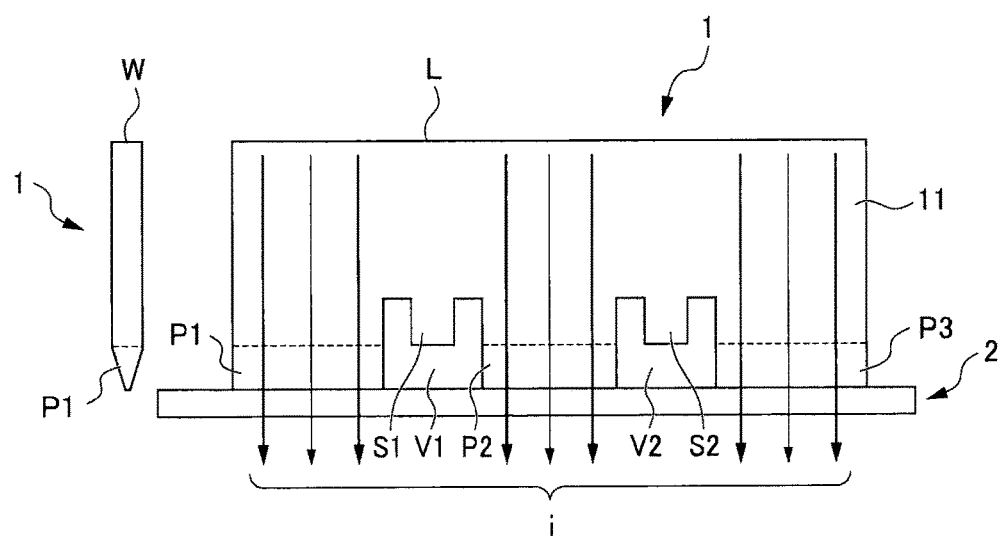
FIG. 2 is a drawing for explaining the welded article according to the first embodiment of the present invention.
Figure 3:
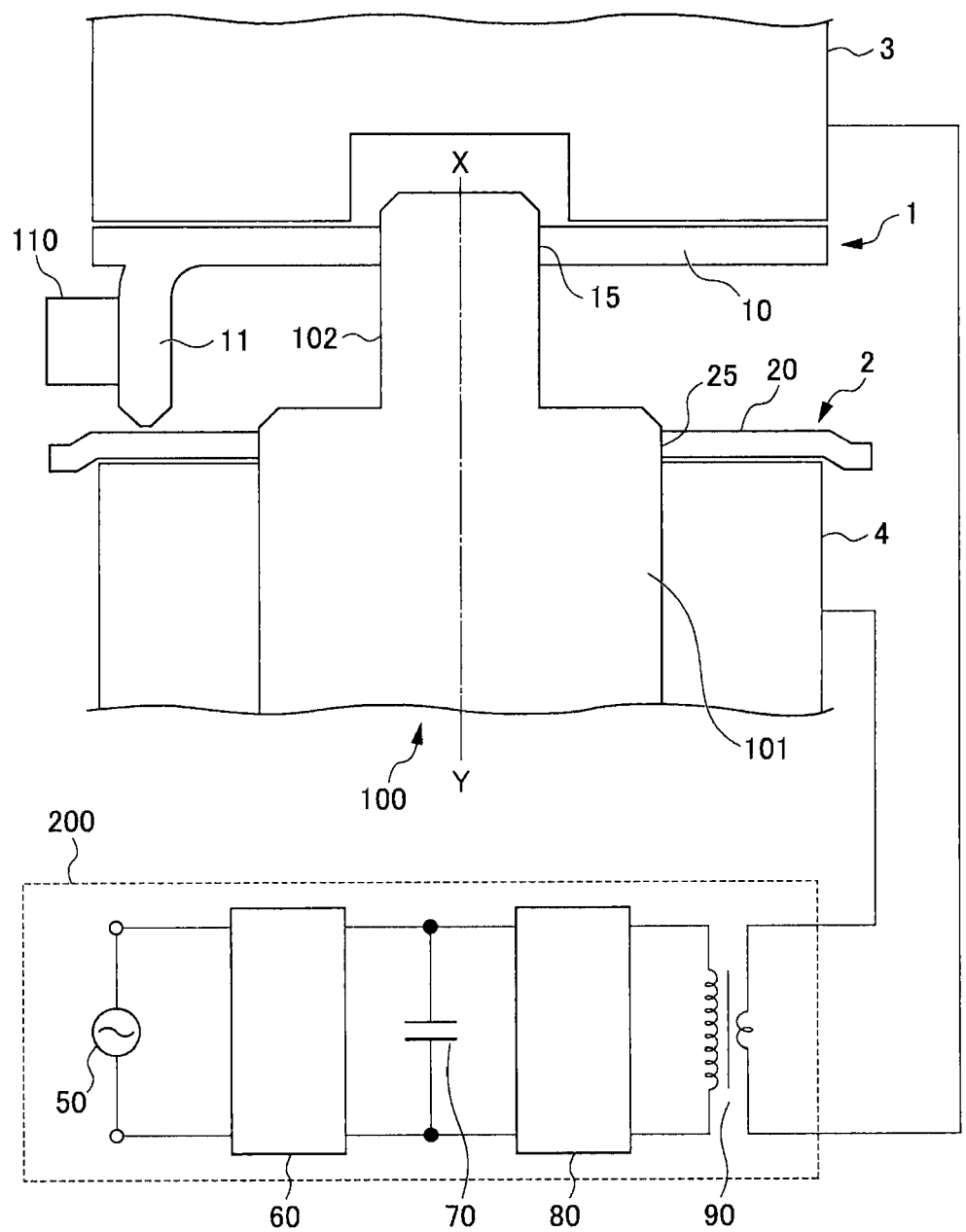
FIG. 3 is a drawing for explaining a manufacturing apparatus that implements a manufacturing method according to the first embodiment of the present invention.

In FIG. 2, while only the leg portion 11 is shown as a representative of the four leg portions 11 to 14 of the carrier cover, the other leg portions 12, 13 and 14 are the same as the leg portion 11 with regard to the subdividing grooves, projection portions, stopper portions and so on, which are described later. The leg portion 11 has short sides W extending in its thickness direction and long sides L extending in its length direction. The long sides L are preferably arcuate but may be straight. The leg portion 11 of the first welding target member 1 has a projection portion P on a welding target portion thereof. The projection portion P, which is an ordinary one and is not therefore described, is distinctly different from conventional ones in that two subdividing grooves V1 and V2 extending across the projection portion P into a part of the leg portion adjacent to the projection portion P are formed to at least subdivide the projection portion P into three projection portions P1, P2 and P3.

In this first embodiment, the subdividing grooves V1 and V2 are formed beyond the projection portion P in the leg portion 11 and extend deeply into a part that is located adjacent to the projection portion P and does not contribute to welding. In addition, stopper portions S1 and S2 are formed in the subdividing grooves V1 and V2, respectively. The stopper portions S1 and S2 extend from bottom faces of the subdividing grooves V1 and V2 in the direction of the projection portions P1, P2 and P3. The stopper portions S1 and S2 have the same level of height. Because the projection portions P1, P2 and P3 are melted during welding until the stopper portions S1 and S2 contact the welding target face 20 of the second welding target member 2, the stopper portions S1 and S2 almost determines the height of the projection portions P1, P2 and P3. The stopper portions S1 and S2 have a function of making the welding depth uniform and making the welding strength uniform. The subdividing grooves V1 and V2 also serve to receive molten metal material and therefore improve the appearance of the welded part.

In FIG. 2, the flow of welding currents is shown by arrows i in a simulative fashion to explain the influence of skin effect on the welding currents. The thickness of each arrow i represents how large or small the value of the welding current is. When the projection portion P is subdivided into three projection portions P1, P2 and P3 by the subdividing grooves V1 and V2, the length of the projection portions P1 to P3 in the direction of the long sides L is naturally shorter than ⅓ the length of the projection portion P before the subdivision in view of the width of the subdividing grooves V1 and V2 in the direction of the long sides L and the influence of skin effect decreases accordingly.

Although the influence of skin effect on the welding current flowing through each of the projection portions P1 to P3 decreases, the tendency for the welding current that flows through the center of each of the projection portions P1, P2 and P3 to be smaller and for the welding currents that flow through both ends of each of the projection portions P1, P2 and P3 to be larger as indicated by the thickness of the arrows i is created in the direction of the long sides L of each of the projection portions P1 to P3 by the influence of skin effect. However, because the length of each of the projection portions P1, P2 and P3 is much smaller than ⅓ the length of the projection portion P before the subdivision as described above, the influence of skin effect is much smaller and the difference between the welding current flowing through a central portion of the projection portions P1, P2 and P3 and the welding currents flowing through both end portions thereof becomes much smaller accordingly. Thus, the uniformity of the welding currents that flow through each of the projection portions P1, P2 and P3 improves. This is demonstrated by the fact that the difference between the welding current flowing through the central portion of the projection portion P2 located at the center and the welding currents flowing through the outer end portions of the projection portions P1 and P3 is much smaller than the difference between the welding current flowing through the central portions of the projection portion P and the welding currents flowing through both end portions thereof before the subdivision, and the uniformity of the welding currents flowing through each of the projection portions P1 to P3 is significantly improved.

Here, because the four leg portions 11, 12, 13 and 14 are bent almost at a right angle from the circular main body portion 10, the outer periphery of the main body portion 10 is endless. Thus, the welding currents that flow through the four leg portions 11, 12, 13 and 14 are not affected by the influence of skin effect, and the magnitudes of the welding currents that flow through the four leg portions 11, 12, 13 and 14 are not made different by the influence of skin effect.

This first embodiment is described with the description of FIG. 3 showing a welding apparatus for implementing a resistance welding method according to an embodiment the present invention. This welding apparatus includes, in addition to the first welding electrode 3 and the second welding electrode 4 described above, a welding power source 200 having an AC power source 50, such as a commercial AC power source or AC power generator, a DC power source circuit 60 that converts AC into DC, an energy storage capacitor 70 having a plurality of capacitors connected in parallel, a switch circuit 80 that converts the electrical energy stored in the energy storage capacitor 70 into one or more large current pulses and discharges the current pulses, such as a discharge switch or inverter circuit, and a welding transformer 90 including a secondary winding having 1 or 2 turns and a primary winding having a larger number of turns than the secondary winding. The first welding electrode 3 and the second welding electrode 4 are connected to the secondary winding of the welding transformer 90. The welding apparatus also includes a positioning mechanism 100 for positioning the first welding target member 1 and the second welding target member 2, and a deformation prevention mechanism 110 for preventing the four leg portions 11, 12, 13 and 14 of the first welding target member 1 from being deformed outward. The positioning mechanism 100 and the deformation prevention mechanism 110 are made of an electrically insulating material or electrically insulated from other components so that a portion of the welding current cannot flow therethrough during welding. A drive mechanism or pressure mechanism that increases and decreases the distance between the first welding electrode 3 and the second welding electrode 4 and so on are omitted from illustration.

In FIG. 3, the first welding target member 1 and the second welding target member 2 have the structures shown in FIG. 1A, 1B and FIG. 2. The positioning mechanism 100 includes a large-diameter portion 101 with a diameter that is slightly smaller than that of the central hole 25 of the second welding target object 2, and a small-diameter portion 102 with a diameter that is slightly smaller than that of the central hole 15 of the first welding target member 1. The positioning mechanism 100 has such a structure that the small-diameter portion 102 extends from the center of an upper face of the large-diameter portion 101, and the center of the small-diameter portion 102 and the center of the large-diameter portion 101 are located on the central axis X-Y. It should be noted that only the leg portion 11 is shown among the direct welding target members, the leg portions 11 to 14, and a part of the main body portion 10 is cut away so that the small-diameter portion 102 is visible in FIG. 3.

First, the large-diameter portion 101 of the positioning mechanism 100 is inserted into the central hole 25 of the second welding target member 2 to place the second welding target member 2 in a predetermined position on the second welding electrode 4. Next, the small-diameter portion 102 of the positioning mechanism 100 is inserted into the central hole 15 of the first welding target member 1 to place the first welding target member 1 in a predetermined position on the second welding target member 2. At this time, the four leg portions 11, 12, 13 and 14 of the first welding target member 1 contacts the second welding target member 2 at positions corresponding to the rectangular areas 21, 22, 23 and 24 shown by broken lines on the welding target face 20 of the second welding target member 2 in FIG. 1B. Actually, as shown in FIG. 2, the leg portion 11 contacts the welding target face 20 of the second welding target member 2 at end faces of the three subdivided projection portions P1, P2 and P3. The leg portions 12, 13 and 14 are the same as the leg portion 11 in this regard. The deformation prevention mechanism 110, which is not shown in detail, includes four diameter increasing/decreasing members that simultaneously move radially inward or outward, for example. These members are structured to prevent the corresponding leg portions 11, 12, 13 and 14 from being deformed outward beyond a predetermined deformation amount. However, the diameter increasing/decreasing members substantially do not press the leg portions 11, 12, 13 and 14 radially inward in an ordinary condition not to interfere with the resistance welding.

In this state, the first welding electrode 3 is moved downward to apply a pressure in a direction along the central axis X-Y to the main body portion 10 of the first welding target member 1. As a result, a pressing force is applied between the three subdivided projection portions P1, P2 and P3 of each of the leg portions 11, 12, 13 and 14 and the welding target face 20 of the second welding target member 2. In this state, the switch circuit 80 is turned on. Then, the electric charge preliminarily charged in the energy storage capacitor 70 is discharged, and a welding current with a single waveform flows between the three subdivided projection portions P1, P2 and P3 of each of the leg portions 11, 12, 13 and 14 and the welding target face 20 of the second welding target member 2. By the welding current, heat is rapidly generated at the spots where the three subdivided projection portions P1, P2 and P3 of each of the leg portions 11, 12, 13 and 14 are in contact with the welding target face 20 of the second welding target member 2 and the metal materials of both the members are melted and mixed together to form a nugget. As a result, good projection welding is achieved.

Here, the three subdivided projection portions P1, P2 and P3 of each of the leg portions 11 to 14 are melted. Because the projection portions P1, P2 and P3 and the welding target face 20 of the second welding target member 2 are pressed against each other by the pressing force with their contact regions melted, the stopper portions S1 and S2 shown in FIG. 2 are brought into contact with the welding target face 20 of the second welding target member 2. This completes the substantial resistance welding. The stopper portions S1 and S2 not only have a function of making the welding depth uniform and making the welding strength uniform but also, if a welding current is still flowing through the welded portion when the stopper portions S1 and S2 contact the welding target face 20 of the second welding target member 2, allows a portion of the welding current to escape through them. This helps to prevent the welded portion from being excessively melted to improve the welding quality and welding strength even when there are variations in the first welding target member 1 and the second welding target member 2.

Because the projection portion of each of the leg portions 11, 12, 13 and 14 is subdivided into three projection portions P1, P2 and P3 by the subdividing grooves V1 and V2 as described above, the non-uniformity of the magnitude of the welding currents caused by the influence of skin effect is remarkably reduced. The difference in magnitude between the welding current flowing through the central portion of the projection portion P2 located at the center of each of the leg portions 11 to 14 and the welding currents flowing through the outer end portions of the projection portions P1 and P3 is much smaller than the difference in magnitude between the welding currents flowing through the central portion and the welding currents flowing through the both end portions of each of the leg portions 11 to 14 when the projection portion P of the leg portions 11 to 14 is not subdivided. Here, the magnitude of a welding current refers to the peak value of the welding current or the amount of current that contribute to the welding.

Thus, in an embodiment of the present invention, the magnitudes of welding currents that flow through the outer end portions of the projection portions P1 and P3 can be selected such that a welding current with a sufficient magnitude to allow the formation of a satisfactory nugget without causing incomplete or excessive melting of the central portion of the projection portion P2 located at the center of each of the leg portions 11 to 14 flows and a good nugget is formed without causing excessive melting of the outer end portions of the projection portions P1 and P3 of each of the leg portions 11 to 14. The embodiment of the present invention, in which the influence of skin effect on the welding current is decreased by subdividing the projection portion of each of the leg portions 11 to 14 as described above, enables resistance welding that can provide both the central portion and the end portions of each of the leg portions 11 to 14 with satisfactory welding strength. While an example in which the leg portion of the carrier cover is divided into four parts is described in this first embodiment, the leg portion may be divided almost equally into two or three parts, or into five or more parts.

Second Embodiment

Figure 4:
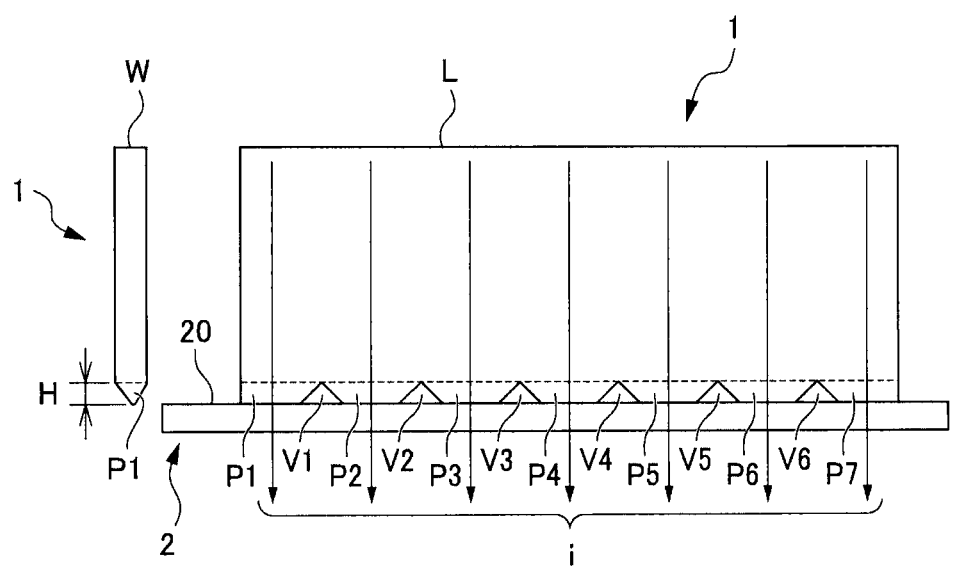
FIG. 4 is a drawing for explaining a welded article according to a second embodiment of the present invention.

A second embodiment according to the present invention is next described with reference to FIG. 4. The first welding target member 1 is a metal plate having a flat face, or a metal plate having a curved face, such as an arcuate face or wavy face. The metal plate has a thickness which is sufficiently smaller than the straight or curved length of the curved face. Thus, the face of the metal plate that defines its thickness is a straight or curved, elongated face. The thickness of the first welding target member 1 is represented by a short side W, and the length of the flat or curved face is represented by a long side L. The long sides L are straight or curved depending on the shape of the metal plate. The second welding target member 2 is a metal member having a flat face. The first welding target member 1 is bonded to the flat face of the second welding target member 2 by stud resistance welding.

Subdivided projection portions P1, P2, P3, P4, P5, P6 and P7 are provided on a welding target portion of the first welding target member 1 defined by the short sides W and the long sides L. These projection portions P1 to P7 are formed by subdividing a projection formed in a similar manner to conventional one with subdividing grooves V1, V2, V3, V4, V5 and V6. The subdividing grooves V1 to V6 have a triangular shape. While the second embodiment shows an example in which the subdividing grooves V1, V2, V3, V4, V5 and V6 are formed, it shows that an arbitrary number of subdividing grooves may be basically provided depending on the length of the long sides L. While the projection portions P1 to P7 has a height H that is almost equal to the depth of the subdividing grooves V1 to V6 as indicated by broken lines in FIG. 4, the width or depth of the grooves can be easily adjusted by changing the inclination angle of the subdividing grooves V1 to V6. In addition, because a multiplicity of subdividing grooves can be easily formed at arbitrary positions, the influence of skin effect can be further decreased to make the bonding currents uniform.

Also in this second embodiment, the influence of skin effect on the welding current can be significantly reduced and the uniformity of the welding currents flowing through each of the projection portion P1 to P7 can be improved because each projection portion P is subdivided into seven projection portion P1 to P7 by the subdividing grooves V1 to V6, and the projection portion P1 to P7 have a length which is much smaller than L/7 in view of the width of the subdividing grooves V1 to V6. Thus, according to this embodiment, a metal plate having straight or curved long sides L with a considerable length can be bonded to the second welding target member 2 by stud resistance welding by selecting the number and width of the subdividing grooves within a range in which a welding target portion with an area that provides a necessary welding strength can be formed.

Third Embodiment

Figure 5:
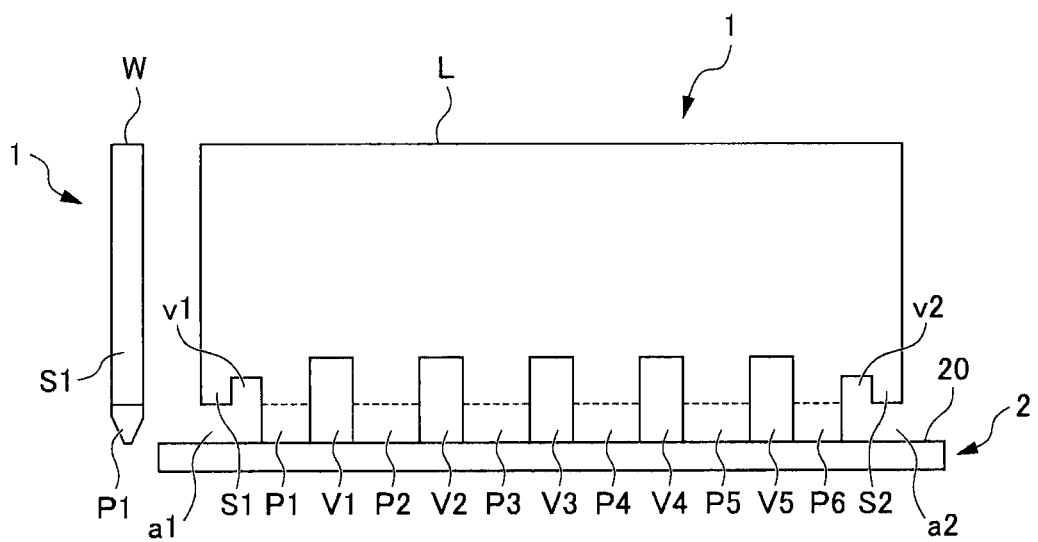
FIG. 5 is a drawing for explaining a welded article according to a third embodiment of the present invention.
Figure 6:
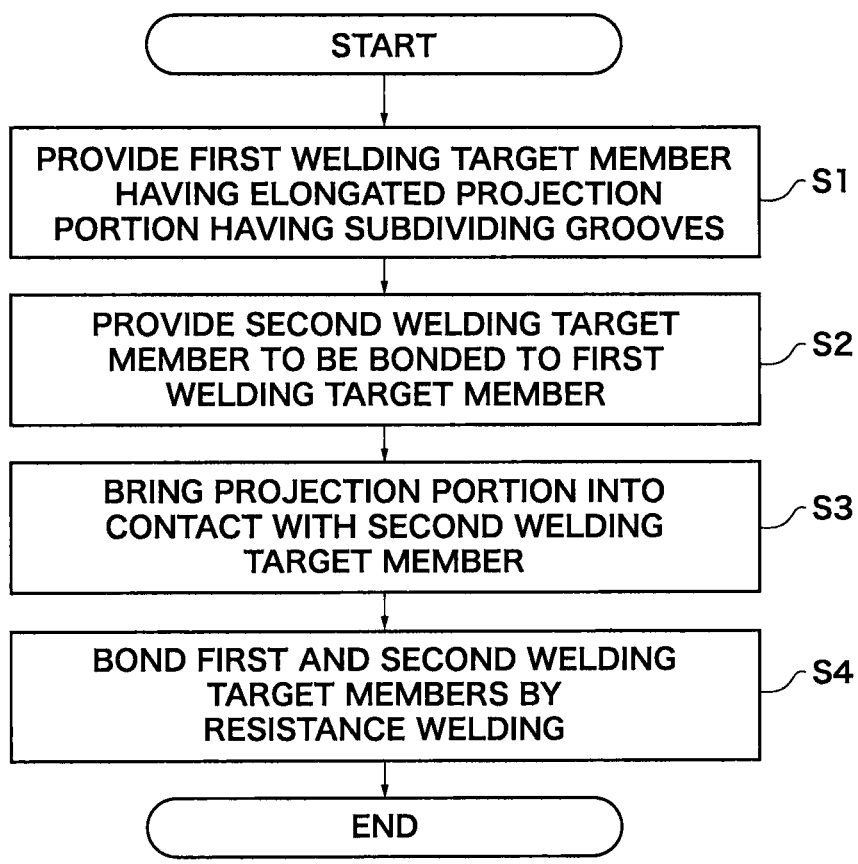
FIG. 6 is a flowchart showing a method for manufacturing a welded article according to an embodiment of the present invention.

A third embodiment according to the present invention is next described with reference to FIG. 5. While the first welding target member 1 is similar to the metal plate used in the second embodiment, the projection portions at both ends are removed to form stopper portions S1 and S2 at both ends and cause them to have a function of increasing the heat capacity at both ends. The spaces formed by removing the projection portions at both ends are designated as a1 and a2. The size of the spaces a1 and a2 is determined based on the area of the welding target portion that can provide desired contact strength and so on. The projection portion is subdivided into projection portions P1, P2, P3, P4, P5 and P6 by subdividing grooves V1, V2, V3, V4 and V5. The subdividing grooves V1 to V5 are formed deeper or higher than the height of the projection portions P1 to P6 (wedge shaped portion). The reference numerals v1 and v2 designate clearance grooves that receive a part of the projection portions P1 and P6 when they are melted.

Also in the third embodiment, the influence of skin effect on the welding current is reduced to improve the uniformity of the welding currents that flow through the projection portions P1 to P6 as described above by subdividing the projection portion into the projection portions P1 to P6 with the subdividing grooves V1 to V5. The reduction of the influence of skin effect is the same as in the first and second embodiments described above. The main difference of the third embodiment from the first and second embodiments is that the both end portions of the first welding target object member 1 are formed into the stopper portions S1 and S2.

While the welding method, which is carried out in the same manner as in the first and second embodiments, is not described in detail, the projection portions P1 to P6 are almost melted to form a nugget together with a molten portion of the second welding target object member 2 when the projection welding approaches completion. The molten portions of both the welding target members are mixed together and pressed against each other by the pressing force, and the resistance welding is substantially completed when the stopper portions S1 and S2 contact the welding target face 20 of the second welding target object member 2.

In embodiments of this invention, the shape of the subdividing grooves is not specifically limited. The subdividing grooves may have a structure easy to form. The width and the number of the subdividing grooves are not limited as long as a welding target area that provides required welding strength can be ensured. The width (length) of the subdividing grooves and the width (length) of each subdivided projection portion in the direction of the long sides L may not be uniform. For example, the subdividing grooves close to the center of the first welding target member 1 may be formed to have a smaller width than the subdividing grooves on both sides to increase the heat generation therein caused by the welding current close to the center. The second welding target member, which is described as a metal plate having a flat face in the embodiments described above, may be a metal pipe or the like. In addition, when the long sides L of the first welding target member 1 are so long, in other words, the projection portion is so long that good welding quality cannot be achieved simply by subdividing the projection portion to reduce the influence of skin effect, the measures such as increasing the leakage inductance or circuit inductance of the welding transformer to increase the pulse width of the welding current are effective.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS

1: first welding target member
10: main body portion of carrier cover as first welding target member 1
11 to 14: leg portion of carrier cover as first welding target member 1
15: central hole of main body portion 10 of carrier cover
W: short side of first welding target member 1
L: long side of first welding target member 1
P: projection portion of first welding target member 1
P1 to P7: subdivided projection portion
V1 to V6: subdividing groove for subdividing projection portion P
S1, S2: stopper portion of first welding target member 1
a1, a2: space formed by removing both ends of projection portion P
2: second welding target member
20: welding target face of second welding target member 2
21 to 24: rectangular area indicating the spots where leg portions 11 to 14 are welded
25: central hole of disk-shaped metal plate as second welding target member 2
3: first welding electrode
4: second welding electrode
50: AC power source
60: DC power source circuit
70: energy storage capacitor
80: switch circuit
90: welding transformer
100: positioning mechanism
101: large-diameter portion of positioning mechanism 100
102: small-diameter portion of positioning mechanism 100
110: deformation prevention mechanism
200: welding power source
i: welding current
v1, v2: clearance groove for molten metal

The invention claimed is:

1. A method for manufacturing a welded article, comprising the steps of:
providing a first welding target member including an elongated projection portion having short sides and long sides that are longer than the short sides;
providing a second welding target member to be bonded to the first welding target member by welding; and
bringing the projection portion into contact with the second welding target member and bonding the first and second welding target members by resistance welding,
wherein the projection portion has a plurality of subdivided projection portions separated by subdividing grooves formed into the projection portion at different positions along the long sides of the projection portion, in order to improve the uniformity of current values in the direction of the long sides of welding currents flowing through the subdivided projection portions;
the subdivided projection portions are in parallel, the subdividing grooves extend into a part located adjacent to the projection portion where the part located adjacent to the projection portion does not contribute to welding, and the part located adjacent to the projection portion is a part extended in parallel from the projection portion to the bottom of the subdividing grooves,
wherein the first welding target member includes two end portions in the direction of the long sides.

2. The method for manufacturing a welded article according to claim 1,
wherein stopper portions are provided in the subdividing grooves or at both ends of the first welding target member so that the stopper portions can contact the second welding target member at completion of welding to stop progress of welding and allow a portion of the welding current to escape through the stopper portions.

3. The method for manufacturing a welded article according to claim 2,
wherein the first welding target member is a carrier cover with a plurality of leg portions in a gear portion;
the second welding target member is a base plate in the gear portion, each of the plurality of leg portions has the projection portion subdivided by the subdividing grooves on an end face of the leg portion; and
the subdivided projection portion is bonded to a welding target portion of the base plate by resistance welding.

4. The method for manufacturing a welded article according to claim 2,
wherein the first welding target member is a metal plate having a flat or curved face, the metal plate having a thickness defined by the short sides, the flat or curved face of the metal plate having a length defined by the long sides, the metal plate having the plurality of subdivided projection portions formed by the subdividing grooves on a face of the metal plate, the face of the metal plate defining its thickness, and the projection portion being a welding target portion; and
the subdivided projection portions of the metal plate is bonded to a welding target portion of the second welding target member by resistance welding.

5. The method for manufacturing a welded article according to claim 1,
wherein the first welding target member is a carrier cover with a plurality of leg portions in a gear portion;
the second welding target member is a base plate in the gear portion,
each of the plurality of leg portions has the projection portion subdivided by the subdividing grooves on an end face of the leg portion; and
the subdivided projection portion is bonded to a welding target portion of the base plate by resistance welding.

6. The method for manufacturing a welded article according to claim 1,
wherein the first welding target member is a metal plate having a flat or curved face, the metal plate having a thickness defined by the short sides, the flat or curved face of the metal plate having a length defined by the long sides, the metal plate having the plurality of subdivided projection portions formed by the subdividing grooves on a face of the metal plate, the face of the metal plate defining its thickness, and the projection portion being a welding target portion; and
the subdivided projection portions of the metal plate is bonded to a welding target portion of the second welding target member by resistance welding.

* * * * *